US010815871B2

(12) United States Patent
Saad et al.

(10) Patent No.: US 10,815,871 B2
(45) Date of Patent: Oct. 27, 2020

(54) ENGINE SYSTEM FOR EMISSION REDUCTION WITHOUT AFTERTREATMENT

(71) Applicant: Cummins Inc., Columbus, IN (US)

(72) Inventors: Philipe F. Saad, Columbus, IN (US); Leon A. LaPointe, Columbus, IN (US); Premjee Sasidharan, Columbus, IN (US); Atsuhiko Watanabe, London (GB)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/483,675

(22) PCT Filed: Jan. 31, 2018

(86) PCT No.: PCT/US2018/016074
§ 371 (c)(1),
(2) Date: Aug. 5, 2019

(87) PCT Pub. No.: WO2018/144498
PCT Pub. Date: Aug. 9, 2018

(65) Prior Publication Data
US 2020/0018223 A1    Jan. 16, 2020

Related U.S. Application Data

(60) Provisional application No. 62/455,049, filed on Feb. 6, 2017.

(51) Int. Cl.
*F02F 3/28*     (2006.01)
*F02B 19/12*    (2006.01)
(Continued)

(52) U.S. Cl.
CPC ............ *F02B 19/12* (2013.01); *F02B 19/108* (2013.01); *F02B 19/1019* (2013.01);
(Continued)

(58) Field of Classification Search
CPC ...... F02B 19/12; F02B 19/00; F02B 19/1019; F02B 19/16; F02B 37/183; F02B 19/02;
(Continued)

(56) References Cited

U.S. PATENT DOCUMENTS 1,648,647 A * 11/1927 Krettingen .............. F02B 19/14
                                                     123/275
2,831,468 A *  4/1958 Witzky   ............... F02B 23/0672
                                                     123/263
(Continued)

FOREIGN PATENT DOCUMENTS

WO    2009068582 A1    6/2009

OTHER PUBLICATIONS

International Preliminary Report on Patentability received for PCT Patent Application No. PCT/US2018/016074, dated Apr. 18, 2019, 13 pages.
(Continued)

*Primary Examiner* — Jacob M Amick
(74) *Attorney, Agent, or Firm* — Faegre Drinker Biddle & Reath LLP

(57) ABSTRACT

An engine system comprising an internal combustion engine and a turbocharger, where a diameter of the at least one intake valve is greater than a diameter of the at least one exhaust valve, the salient angle of the piston bowl is at least 10 degrees, the ratio between the piston bowl opening diameter and the piston bowl depth is approximately 0.5 to 2.0, the intake valve opens before top dead center on an exhaust stroke of the internal combustion engine and closes before bottom dead center of an intake stroke of the internal combustion engine, and the turbocharger has a combined efficiency of more than 50%.

19 Claims, 5 Drawing Sheets

(51) Int. Cl.
  *F02B 37/18* (2006.01)
  *F02F 1/42* (2006.01)
  *F02B 19/16* (2006.01)
  *F02B 19/10* (2006.01)
(52) U.S. Cl.
  CPC ............ *F02B 19/16* (2013.01); *F02B 37/183* (2013.01); *F02F 1/42* (2013.01); *F02F 3/28* (2013.01)
(58) Field of Classification Search
  CPC . F02B 19/108; F02B 19/06; F02F 1/42; F02F 3/28
  See application file for complete search history.

(56) References Cited

U.S. PATENT DOCUMENTS

| | | | |
|---|---|---|---|
| 4,036,202 A * | 7/1977 | Weslake | F02B 19/12 123/279 |
| 4,522,172 A * | 6/1985 | Oshima | F02B 23/0624 123/259 |
| 5,829,407 A * | 11/1998 | Watson | F02B 19/1014 123/275 |
| 6,276,334 B1 | 8/2001 | Flynn et al. | |
| 7,100,567 B1 | 9/2006 | Bailey et al. | |
| 7,395,668 B2 * | 7/2008 | Gobert | F01D 5/048 123/198 F |
| 8,567,369 B2 | 10/2013 | Johnson | |
| 9,644,527 B2 | 5/2017 | Schaumberger et al. | |
| 2005/0109328 A1 | 5/2005 | Sakai et al. | |
| 2007/0181098 A1 | 8/2007 | De Prato | |
| 2010/0192909 A1 | 8/2010 | Ikeda | |
| 2011/0146618 A1 | 6/2011 | LaPointe et al. | |
| 2012/0103302 A1 | 5/2012 | Attard | |
| 2013/0160734 A1 | 6/2013 | Redtenbacher et al. | |
| 2014/0060479 A1 | 6/2014 | Tozzi et al. | |
| 2015/0068479 A1 * | 3/2015 | Ikeda | F02P 23/045 123/143 B |
| 2015/0107543 A1 * | 4/2015 | Bowing | F02B 23/0621 123/193.6 |
| 2015/0354519 A1 | 12/2015 | Shimo et al. | |
| 2016/0024994 A1 * | 1/2016 | Engineer | F02B 19/12 123/256 |
| 2016/0273443 A1 | 9/2016 | Chiera et al. | |
| 2016/0333770 A1 * | 11/2016 | Kreuter | F02F 3/28 |
| 2017/0145899 A1 * | 5/2017 | Singh | F02B 19/10 |
| 2017/0306917 A1 | 10/2017 | Kim | |

OTHER PUBLICATIONS

International Search Report and Written Opinion issued by the ISA/US, Commissioner for Patents, dated Apr. 19, 2018, for International Application No. PCT/US2018/016074; 9 pages.

* cited by examiner

ENGINE SYSTEM FOR EMISSION REDUCTION WITHOUT AFTERTREATMENT

CROSS-REFERENCE TO RELATED APPLICATIONS

The present application is a U.S. national stage filing of PCT/US2018/016074, filed on Jan. 31, 2018, which claims the benefit of U.S. Provisional Patent Application No. 62/455,049, filed Feb. 6, 2017, the entire disclosures of which are each hereby expressly incorporated herein by reference in their entirety.

TECHNICAL FIELD OF THE DISCLOSURE

The present disclosure relates to an engine system comprising an internal combustion engine and a high efficiency turbocharger, where the engine system as a whole is optimized to reduce emissions and improve brake thermal efficiency without an aftertreatment system.

BACKGROUND OF THE DISCLOSURE

There is a consistent desire to create an engine system that results in lower emissions and higher efficiency. However, common engine designs use aftertreatment systems to achieve lower emissions. The use of aftertreatment systems in engine designs results in additional costs and maintenance with more complicated systems. Thus, it would be beneficial to have an engine system capable of reducing emissions of an engine system without an aftertreatment system in order to avoid the additional costs and maintenance as well as have a more efficient overall engine system.

SUMMARY OF THE DISCLOSURE

In one embodiment of the present disclosure, an engine system comprises an internal combustion engine having a cylinder head including at least one intake valve and at least one exhaust valve, a cylinder block positioned adjacent the cylinder head and comprising at least one cylinder bore, a piston positioned within the cylinder bore and having a bowl machined into a top surface of the piston, the bowl comprising a salient angle between the top surface of the piston and a side of the bowl, an opening diameter, and a depth, a combustion chamber defined by the cylinder head, the cylinder block, and the piston, and a high capability ignition system including an ignition device, an injector, and a pre-chamber, where a diameter of the at least one intake valve is greater than a diameter of the at least one exhaust valve, the salient angle of the piston bowl is at least 10 degrees, the ratio between the piston bowl opening diameter and the piston bowl depth is approximately 0.5 to 2.0, and the intake valve is configured to open before top dead center on an exhaust stroke of the internal combustion engine and close before bottom dead center of an intake stroke of the internal combustion engine, and a turbocharger having a compressor configured to provide compressed air to the internal combustion engine, and a turbine, where the turbocharger has a combined efficiency of more than 50%.

In one aspect of the engine system, the ignition device is one of a spark plug, a laser, a diesel micro-pilot, a high-energy, high frequency electrical field, or a plasma.

In another aspect of the engine system, the engine system further includes a waste gate positioned between the exhaust of the internal combustion engine and the turbine of the turbocharger.

In a further aspect of the engine system, the salient angle is approximately 20 to 25 degrees.

In another aspect of the engine system, the combined efficiency of the turbocharger is approximately 60-70%.

In a further aspect of the engine system, the cylinder head further includes at least one opening for receiving at least a portion of the ignition system.

In another aspect of the engine system, the intake valve is configured to close at least 10 degrees before bottom dead center of the intake stroke of the internal combustion engine.

In a further aspect of the engine system, the intake valve is configured to close between approximately 10 degrees and approximately 60 degrees before bottom dead center of the intake stroke of the internal combustion engine.

In another aspect of the engine system, the intake valve is configured to close approximately 45 degrees before bottom dead center of the intake stroke of the internal combustion engine.

In a further aspect of the engine system, the pre-chamber includes at least one orifice in fluid communication with the combustion chamber.

In another aspect of the engine system, the pre-chamber is open-ended into the combustion chamber.

In a further aspect of the engine system, a closing angle of the intake valve is modulated in response to engine load requirements.

In another aspect of the engine system, the pre-chamber extends into the combustion chamber.

In another embodiment of the present disclosure, an internal combustion engine is configured to couple to a turbocharger, and comprises a cylinder head including at least one intake valve and at least one exhaust valve, a cylinder block positioned adjacent the cylinder head and comprising at least one cylinder bore, a piston positioned within the cylinder bore and having a bowl machined into a top surface of the piston, the bowl comprising a salient angle between the top surface of the piston and a side of the bowl, an opening diameter, and a depth, and a combustion chamber defined by the cylinder head, the cylinder block, and the piston, where a diameter of the at least one intake valve is greater than a diameter of the at least one exhaust valve, the salient angle of the piston bowl is at least 10 degrees, the ratio between the piston bowl opening diameter and the piston bowl depth is approximately 0.5 to 2.0, and the intake valve is configured to open before top dead center on an exhaust stroke of the internal combustion engine and close before bottom dead center of an intake stroke of the internal combustion engine.

In one aspect of the internal combustion engine, the internal combustion engine further comprises a turbocharger having a compressor configured to provide compressed air to the internal combustion engine, and a turbine.

In a further aspect of the internal combustion engine, the turbocharger has a combined efficiency of more than 50%.

In another aspect of the internal combustion engine, the combined efficiency of the turbocharger is approximately 60-70%.

In a further aspect of the internal combustion engine, the internal combustion engine further comprises a high capability ignition system including an ignition device, an injector, and a pre-chamber.

In another aspect of the internal combustion engine, the intake valve is configured to close at least 10 degrees before bottom dead center of the intake stroke of the internal combustion engine.

BRIEF DESCRIPTION OF THE DRAWINGS

Advantages and features of the embodiments of this disclosure will become more apparent from the following detailed description of exemplary embodiments when viewed in conjunction with the accompanying drawings, wherein.

Figure 1:
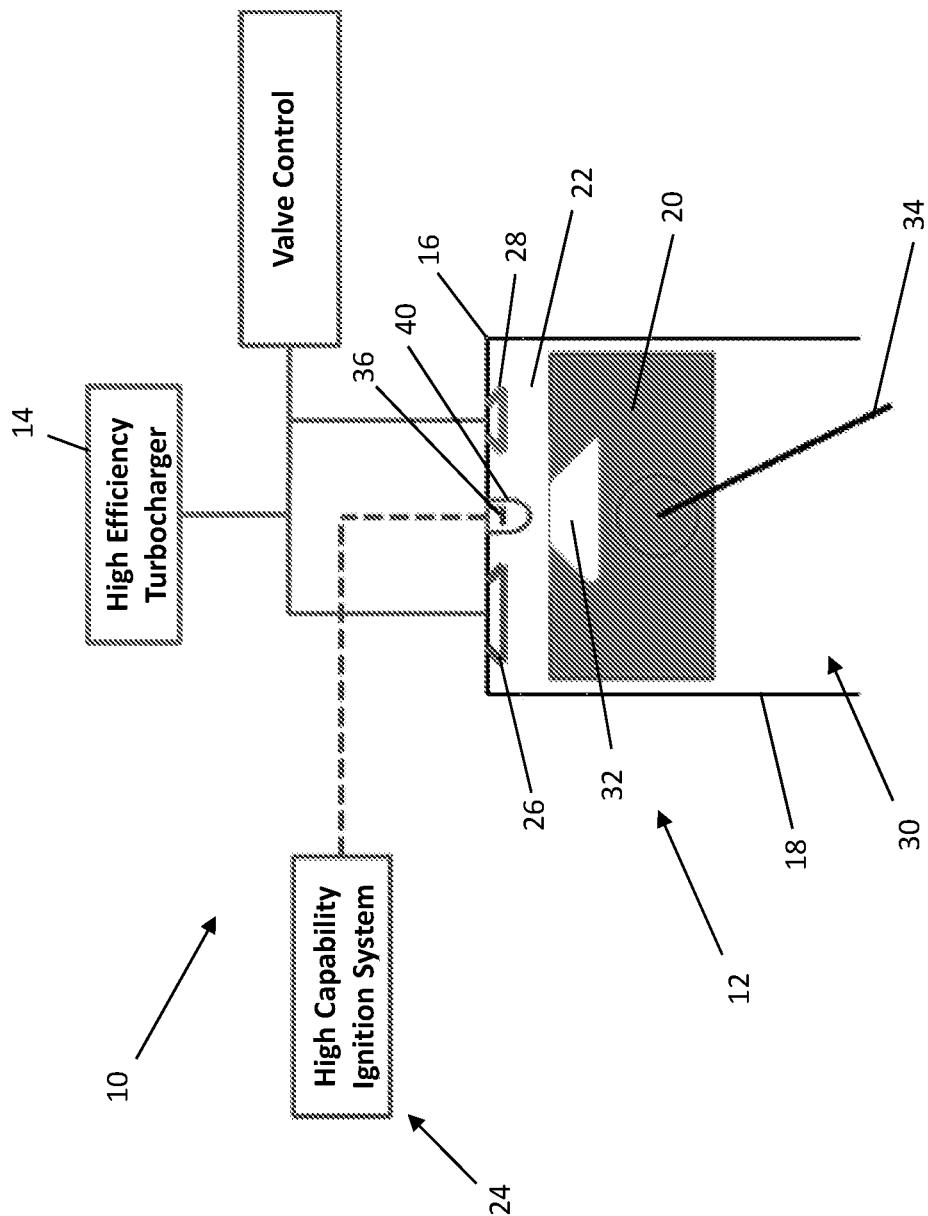
FIG. 1 is a schematic view of an embodiment of an engine system of the present disclosure including an internal combustion engine and a turbocharger.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

Figure 2:
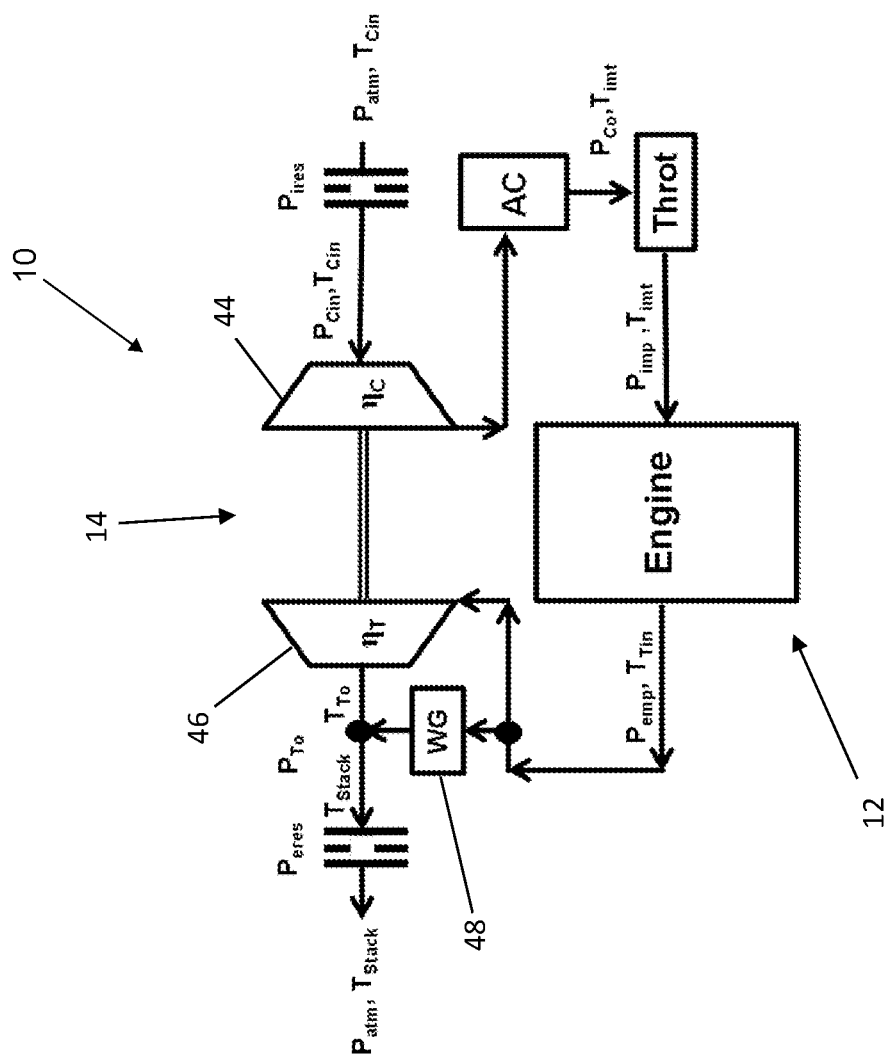
FIG. 2 is a schematic view of another embodiment of an engine system of the present disclosure further including a waste gate.

Referring to FIGS. 1 and 2, an engine system 10 generally includes an internal combustion engine 12, and a high efficiency turbocharger 14 coupled to internal combustion engine 12. Internal combustion engine 12 generally includes a cylinder head 16, a cylinder block 18, a piston 20, a combustion chamber 22, and a high capability ignition system 24.

Figure 4:
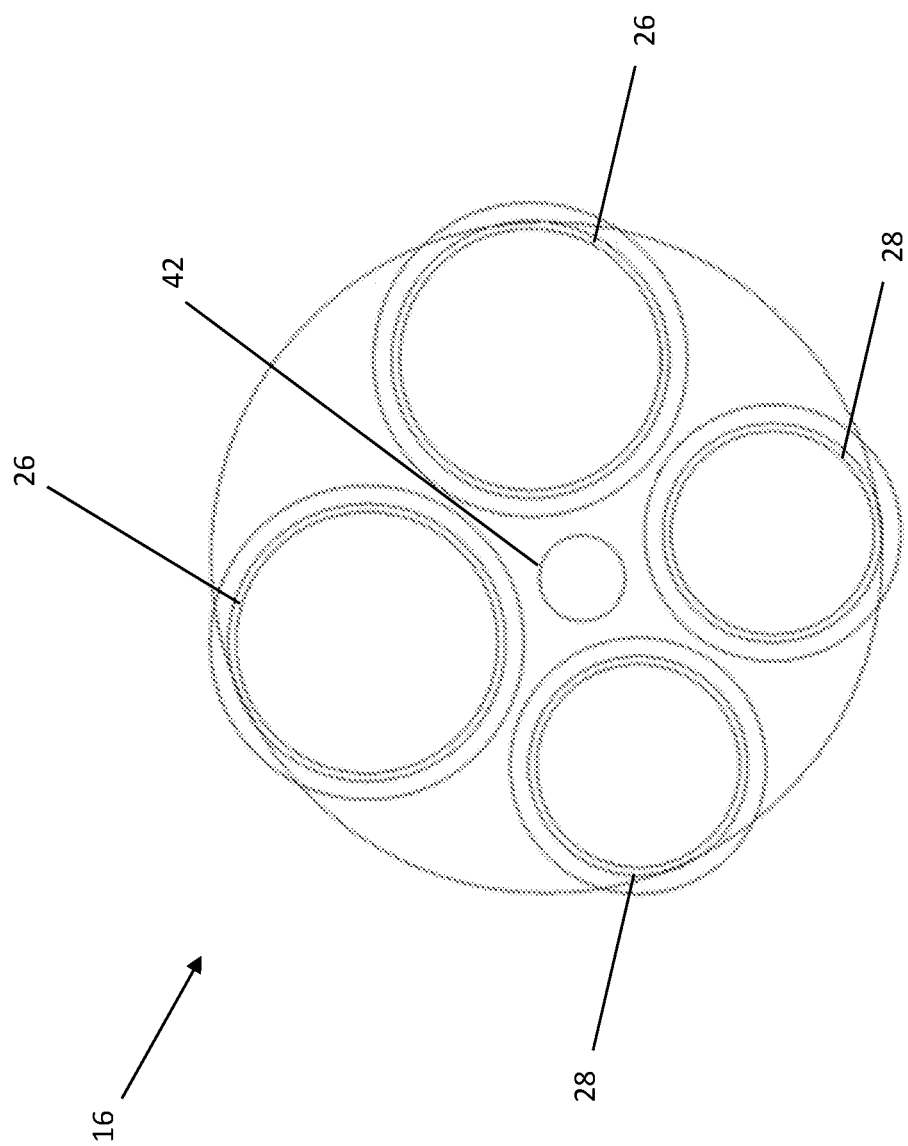
FIG. 4 is a top plan view of valve bores in a cylinder head of the internal combustion engine of FIG. 1.

Cylinder head 16 of engine 12 generally includes at least one intake valve 26 and at least one exhaust valve 28, where a diameter of intake valve 26 is greater than a diameter of exhaust valve 28. In various embodiments, the ratio between the diameters of intake valve 26 and exhaust valve 27 is between approximately 0.7 and 0.9. The larger diameter of intake valve 26 reduces restriction on getting charge into engine 12 during an intake stroke of engine 12. The charge may comprise air only or a mixture of fuel and air. Additionally, the larger intake valve allows more charge into engine 12 in a shorter period of time. In the embodiment shown in FIG. 4, cylinder head 16 includes bores for two intake valves 26 and two exhaust valves 28, where the ratio between the diameters of intake valve 26 and exhaust valve 28 is approximately 0.75.

Still referring to FIGS. 1 and 2, cylinder block 18 is generally positioned adjacent cylinder head 16 and generally includes at least one cylinder bore 30 depending on the engine. For example, in a 4-cylinder engine, cylinder block 18 includes four separate cylinder bores. Combustion chamber 22 of each cylinder in internal combustion engine 12 is generally defined by cylinder head 16, cylinder bore 30 within cylinder block 18, and piston 20.

Figure 3:
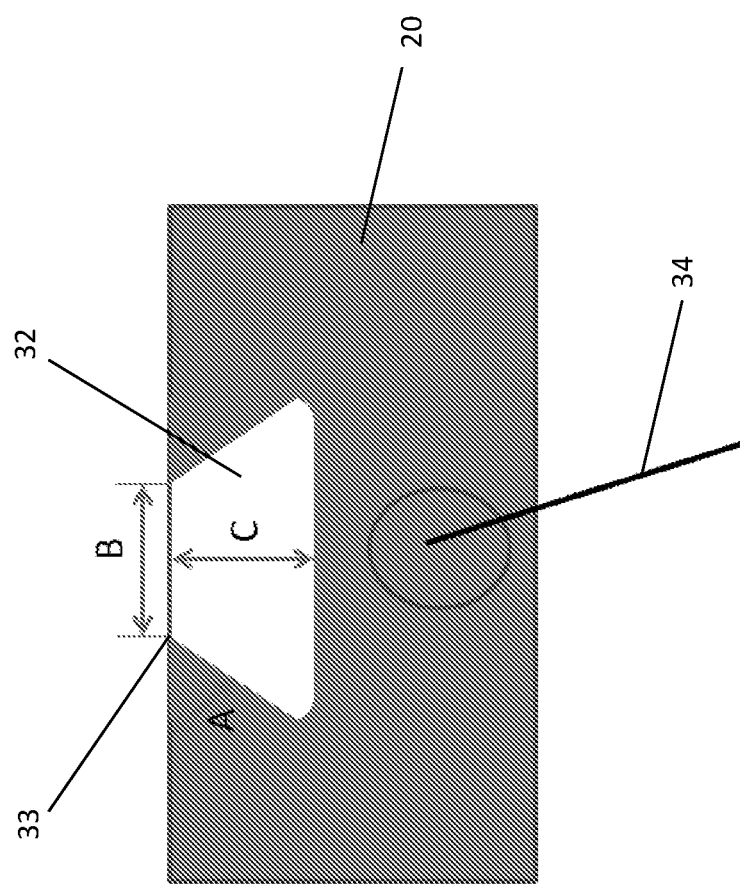
FIG. 3 is a schematic view of a piston of the internal combustion engine of FIG. 1.

Referring to FIG. 3, in each cylinder bore 30 of cylinder block 18 is a piston 20 having a bowl 32 machined into a top or upward facing surface of the piston. Bowl 32 includes a salient angle A between the top surface of piston 20 and an interior wall of bowl 32, an opening diameter B, and a depth C. Bowl 32 is generally configured such that salient angle A is at least 10 degrees, and the ratio between opening diameter B and depth C is approximately 0.5 to 2.0. In various embodiments, salient angle A is approximately 20 to 25 degrees.

With reference still to FIG. 3, piston 20 is generally coupled to a crankshaft (not shown) of internal combustion engine 12 by way of a connecting rod 34. Connecting rod 34 is generally coupled to piston 20 by way of a wrist pin or other coupling device. In various embodiments, piston 20 is configured to generate a high degree of turbulence in the charge during the compression stroke. High turbulence contributes to a fast heat release rate which, in turn, enables high efficiency and low emissions. A piston so configured to generate high charge turbulence during the intake stroke will hereinafter be referred to an "a high turbulence piston". In order for piston 20 to be a high turbulence piston, piston 20 is configured to generate a high compression ratio in the cylinder, with values in the range of 12 to 18. For a given compression ratio, high charge turbulence is encouraged by maximizing depth C and minimizing opening diameter B. When opening diameter B of piston 20 is minimized, bowl 32 generates a high squish velocity, or velocity of the charge as piston 20 approaches top dead center. High squish velocity results in the charge being forced into bowl 32 through a smaller opening diameter B causing an increase in velocity or turbulence of the charge within the combustion chamber. The maximized squish velocity results in a high level of chamber turbulence which generates combustion fast heat release.

However, there are a few constraints on the dimensions of bowl 32. First, maximum depth C is limited by the thickness of the piston between the bottom of the bowl and the bore required for the wrist pin. If the depth C is too large, the thickness at the bottom of the bowl is too small, and the piston will not be able to withstand the heat and pressure of the combustion process. In addition, the ratio between opening diameter B and depth C affect salient angle A of bowl 32, which if too large cause a bowl rim 33 of bowl 32 to become too hot. For instance, if salient angle A is much greater than 20-25 degrees, the bowl rim 33 of bowl 32 becomes too hot and can't be cooled appropriately for efficient operation of engine 12.

Referring again to FIGS. 1 and 2, high capability ignition system 24 generally includes an ignition device 36, an injector (not shown), and a pre-chamber 40. Pre-chamber 40 may be open-ended, or close-ended and having a least one orifice in fluid communication with combustion chamber 22. Pre-chamber 40 is provided to protect ignition device 36 from the high squish velocity created by piston 20. In various embodiments, pre-chamber 40 may extend down into combustion chamber 22, while in other various embodiments, pre-chamber 40 may be positioned above combustion chamber 22. The injector of system 24 is configured to provide fuel to combustion chamber 22 and/or pre-chamber 40 for combustion with air allowed in through intake valve 26. Combustion between the fuel and the air is generally ignited by ignition device 36. Ignition device 36 may be a spark plug, a laser, a diesel micro-pilot, a high-energy, high frequency electrical field, or a plasma, among other technologies. In the embodiment shown in FIG. 1, ignition device 36 is a spark plug. The duration and/or number of strikes and/or discharge profile of ignition device 36 may be varied to achieve stable combustion under dilute conditions such as high exhaust gas recirculation, high excess air, or fuels with high diluents. In various embodiments, cylinder head 16 may further include an opening 42 (FIG. 4) for at least a portion of ignition system 24 between intake valves 26 and exhaust valves 28.

Ignition system 24 is considered a high capability ignition system. A high capability ignition system is one that can generate a long duration electrical discharge at the ignition device 36. Such long duration discharge characteristics accompany a high amount of energy dissipated during the discharge event. A standard capability ignition system dissipates on the order of 10-40 millijoules per discharge event, whereas a high capability discharge system can dissipate 400-1000 millijoules per discharge event. The high capability ignition system enables utilization of intake charge that is very lean and/or dilute with high amount of exhaust gas recirculation, which reduces emissions and improves efficiency.

Referring now to FIG. 2, high efficiency turbocharger 14 generally includes a compressor 44 and a turbine 46. Compressor 44 is configured to provide compressed air to the internal combustion engine through intake valves 26. Turbine 46 is configured to convert engine exhaust gas released through exhaust valves 28 into mechanical energy to drive compressor 44. In order for turbocharger 14 to operate with high efficiency, the combined efficiency of compressor 44 and turbine 46 needs to be greater than 50%. For instance, in one embodiment, compressor 44 and turbine 46 may each be operating at approximately 80% efficiency such that the overall efficiency of the turbocharge may be approximately 60-70%, or more specifically, approximately 64%. Efficiency of the turbocharger is defined by isentropic efficiency, or a comparison between the actual performance of the device and the performance that would be achieved under idealized circumstances for the same inlet and exit states.

With reference still to FIG. 2, engine system 10 may further include a waste gate 48 positioned between the exhaust valve of internal combustion engine 12 and turbine 46 of turbocharger 14. Waste gate 48 generally includes a vent to the exterior, and is generally configured to regulate the pressure at which exhaust gases pass to turbine 46 of turbocharger 14 by opening or closing the vent. In turn, waste gate 48 may be used to regulate the speed of turbine 46, and therefore the speed of compressor 44, thus protecting engine 12 and turbocharger 14 from excessive pressure.

Figure 5:
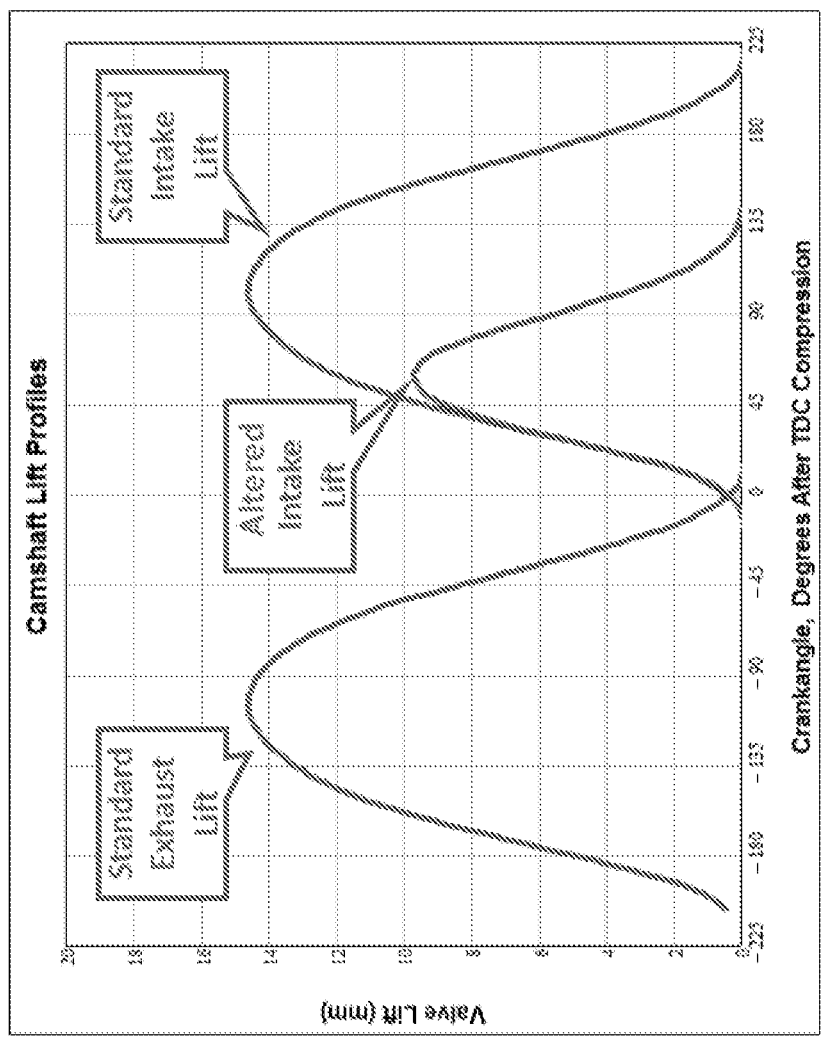
FIG. 5 is a graph of a crankangle of a camshaft versus valve lift of an exhaust valve and an intake valve of the internal combustion engine of FIG. 1.

Referring now to FIG. 5, in operation, internal combustion engine 12 includes an intake stroke, a compression stroke, a power stroke, and an exhaust stroke. In various embodiments of the present disclosure, intake valve 26 is operated in a slightly different manner than normal internal combustion engines. More specifically, intake valve 26 will generally open just before top dead center of the exhaust stroke of engine 12, but close before bottom dead center on the intake stroke of engine 12. For instance, in various embodiments, intake valve 26 will generally close at least 10 degrees before bottom dead center of the intake stroke of engine 12. In some embodiments, intake valve 26 may close between approximately 10 degrees and 60 degrees prior to bottom dead center of the intake stroke. FIG. 5 diagrams the valve lift of exhaust valve 28 and intake valve 26 relative to the crankangle, in degrees, of the crankshaft after top dead center of a compression stroke of engine 12. The altered cycle in FIG. 5 shows intake valve 26 opening just prior to bottom dead center of the intake stroke, and closing approximately 45 degrees prior to bottom dead center of the intake stroke. Closing intake valve 26 early in the intake stroke reduces the dynamic compression ratio, or ratio between the volume of the compression chamber when the intake valve closes and the volume of the compression chamber at its smallest capacity or top dead center, and therefore limits the tendency of the compressed charge to ignite before ignition system 24 tells it to. The arrangement with altered intake life enables high efficiency with low emissions.

The combination of high capability ignition system 24, high efficiency turbocharger 14, large intake valves 26, bowl 32 in piston 20, and the altered cycle of the intake valve make it possible for engine 12 to run as lean as possible, thus allowing the exhaust of engine 12 to have very low quantities of emissions such as NOx, carbon monoxide, and unburnt hydrocarbons without the use of an aftertreatment system. In general, fuels that are resistant to knock should be used in engine system 12 in order to avoid knock, which generally results in failed components of engine 12.

In various embodiments, engine system 10 may further include a variable valve timing system configured to modulate a closing angle of intake valve 26 in response to engine load requirements to achieve transient capability.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An engine system, comprising:
an internal combustion engine having:
a cylinder head including at least one intake valve and at least one exhaust valve;
a cylinder block positioned adjacent the cylinder head and comprising at least one cylinder bore;
a piston positioned within the cylinder bore and having a bowl machined into a top surface of the piston, the bowl comprising a salient angle between the top surface of the piston and a side of the bowl, an opening diameter, and a depth;
a combustion chamber defined by the cylinder head, the cylinder block, and the piston; and
a high capability ignition system including an ignition device, an injector, and a pre-chamber;
wherein a diameter of the at least one intake valve is greater than a diameter of the at least one exhaust valve, the salient angle of the piston bowl is at least 10 degrees, the ratio between the piston bowl opening diameter and the piston bowl depth is approximately 0.5 to 2.0, and the intake valve is configured to open before top dead center on an exhaust stroke of the internal combustion engine and close before bottom dead center of an intake stroke of the internal combustion engine; and
a turbocharger having a compressor configured to provide compressed air to the internal combustion engine, and a turbine,
wherein the turbocharger has a combined efficiency of more than 50%.

2. The engine system of claim 1, wherein the ignition device is one of a spark plug, a laser, a diesel micro-pilot, a high-energy, high frequency electrical field, or a plasma.

3. The engine system of claim 1 further including a waste gate positioned between the exhaust of the internal combustion engine and the turbine of the turbocharger.

4. The engine system of claim 1, wherein the salient angle is approximately 20 to 25 degrees.

5. The engine system of claim 1, wherein the combined efficiency of the turbocharger is approximately 60-70%.

6. The engine system of claim 1, wherein the cylinder head further includes at least one opening for receiving at least a portion of the ignition system.

7. The engine system of claim 1, wherein the intake valve is configured to close at least 10 degrees before bottom dead center of the intake stroke of the internal combustion engine.

8. The engine system of claim 7, wherein the intake valve is configured to close between approximately 10 degrees and approximately 60 degrees before bottom dead center of the intake stroke of the internal combustion engine.

9. The engine system of claim 8, wherein the intake valve is configured to close approximately 45 degrees before bottom dead center of the intake stroke of the internal combustion engine.

10. The engine system of claim 1, wherein the pre-chamber includes at least one orifice in fluid communication with the combustion chamber.

11. The engine system of claim 1, wherein the pre-chamber is open-ended into the combustion chamber.

12. The engine system of claim 1, wherein a closing angle of the intake valve is modulated in response to engine load requirements.

13. The engine system of claim 1, wherein the pre-chamber extends into the combustion chamber.

14. An internal combustion engine configured to couple to a turbocharger, comprising:
a cylinder head including at least one intake valve and at least one exhaust valve;
a cylinder block positioned adjacent the cylinder head and comprising at least one cylinder bore;
a piston positioned within the cylinder bore and having a bowl machined into a top surface of the piston, the bowl comprising a salient angle between the top surface of the piston and a side of the bowl, an opening diameter, and a depth; and
a combustion chamber defined by the cylinder head, the cylinder block, and the piston;
wherein a diameter of the at least one intake valve is greater than a diameter of the at least one exhaust valve, the salient angle of the piston bowl is at least 10 degrees, the ratio between the piston bowl opening diameter and the piston bowl depth is approximately 0.5 to 2.0, and the intake valve is configured to open before top dead center on an exhaust stroke of the internal combustion engine and close before bottom dead center of an intake stroke of the internal combustion engine.

15. The internal combustion engine of claim 14 further comprising a turbocharger having a compressor configured to provide compressed air to the internal combustion engine, and a turbine.

16. The internal combustion engine of claim 15, wherein the turbocharger has a combined efficiency of more than 50%.

17. The internal combustion engine of claim 16, wherein the combined efficiency of the turbocharger is approximately 60-70%.

18. The internal combustion engine of claim 14 further comprising a high capability ignition system including an ignition device, an injector, and a pre-chamber.

19. The internal combustion engine of claim 14, wherein the intake valve is configured to close at least 10 degrees before bottom dead center of the intake stroke of the internal combustion engine.

* * * * *